United States Patent [19]
Hamburg et al.

[11] Patent Number: 5,313,791
[45] Date of Patent: May 24, 1994

[54] METHOD FOR DETECTING CATALYST MALFUNCTIONS

[75] Inventors: Douglas R. Hamburg, Birmingham; Jeffrey A. Cook, Dearborn, both of Mich.

[73] Assignee: Ford Motor Company, Dearborn, Mich.

[21] Appl. No.: 44,524

[22] Filed: Apr. 7, 1993

Related U.S. Application Data

[63] Continuation-in-part of Ser. No. 724,399, Jun. 28, 1991, abandoned.

[30] Foreign Application Priority Data

Jun. 22, 1992 [EP] European Pat. Off. ............ 92305697
Jun. 23, 1992 [JP] Japan ...................................... 165033

[51] Int. Cl.⁵ ................................................ F01N 3/20
[52] U.S. Cl. ...................................... 60/274; 60/276; 60/277
[58] Field of Search .......................... 60/276, 277, 274

[56] References Cited

U.S. PATENT DOCUMENTS

| | | | |
|---|---|---|---|
| 4,029,061 | 6/1977 | Asano | 60/276 |
| 5,025,624 | 6/1991 | Strauss | 60/274 |
| 5,083,427 | 1/1992 | Anderson | 60/276 |

*Primary Examiner*—Douglas Hart
*Attorney, Agent, or Firm*—Peter Abolins; Roger L. May

[57] ABSTRACT

A method of detecting catalyst malfunction in a vehicle uses an exhaust gas oxygen sensor downstream of the catalyst. A feedback loop controls the air-fuel ratio as a function of the output signal from the exhaust gas oxygen sensor. The feedback gain is increased from low gain to high gain and then operational parameters are examined. In a first version the amplitude of the exhaust gas oxygen sensor is used as an indication. In a second version, the amplitude of the exhaust gas oxygen sensor reaches a predetermined limit and then the feedback gain is examined. In a third version, limit-cycle operation is reached and the frequency of the limit-cycle is examined with respect to a predetermined frequency.

11 Claims, 4 Drawing Sheets

METHOD FOR DETECTING CATALYST MALFUNCTIONS

This is a continuation in-part application of U.S. Ser. No. 07/724,399 filed on Jun. 28, 1991, now abandoned.

BACKGROUND OF THE INVENTION

1. Field of the Invention

This invention relates to diagnostic systems for automobiles.

2. Prior Art

It is known to use a catalyst, such as a three-way catalyst, in the exhaust system of an automobile to reduce various types of emissions. It is also known to attempt to determine the condition of the catalyst through the use of exhaust gas oxygen sensors, such as, for example, a heated exhaust gas oxygen sensor (the HEGO), positioned downstream of the catalyst. It is also known to use such a HEGO sensor to achieve improved performance of the air fuel feedback control system for the vehicle engine. The prior art has taught that HEGO sensors located upstream and downstream of a catalyst can be used to monitor the condition of the catalyst when artificial A/F modulation signals are applied to the engine (see U.S. Pat. No. 5,077,970). Since the application of such modulating signals is considered intrusive to the operation of the engine, a method for monitoring the catalyst condition by using the characteristics of the normal post-catalyst feedback system without applying any artificial A/F modulation is desired.

SUMMARY OF THE INVENTION

This invention teaches using the effect of the catalyst on closed-loop operation of the air-fuel feedback loop in order to detect malfunctions in the catalyst. In particular, the invention proposed monitoring the amplitude fluctuations of the post-catalyst HEGO sensor output signal when the gain of the feedback loop including the catalyst and the engine is set at certain levels. When the engine is operated with a high conversion efficiency catalyst and the closed-loop gain is set at a low value, the post-catalyst HEGO sensor output will fluctuate with a high amplitude at a non-specific frequency. When the closed-loop gain setting is increased, the HEGO sensor output will fluctuate in a clearly defined limit-cycle mode at a relatively low frequency.

If the catalyst is replaced by one having a lower conversion efficiency and the closed-loop feedback gain is set low, the post-catalyst HEGO sensor output will fluctuate in a generally random manner with an amplitude which is less than that associated with the high conversion efficiency catalyst. When the closed-loop gain is increased with this lower conversion efficiency catalyst, the HEGO sensor output will fluctuate in a clearly defined limit-cycle mode at a frequency which is higher than that observed with the better catalyst. In order to produce a clean limit-cycle oscillation, the closed-loop gain has to be set higher for the lower efficiency catalyst than for the better catalyst.

Finally, if the catalyst is replaced by a dead or non-functional catalyst and the closed-loop feedback gain is set low, the post-catalyst HEGO sensor output will fluctuate in a generally random manner with an amplitude which is less than that associated with the active catalysts. When the closed-loop gain is increased with the dead catalyst, the HEGO sensor output will fluctuate in a clearly defined limit-cycle mode at a frequency which is higher than that obtained with the active catalysts. In order to produce a clean limit-cycle oscillation, the closed-loop gain has to be set higher with the dead catalyst than for the active catalysts. The invention includes the concept of varying the feedback gain to be compatible with the characteristics of whatever catalyst is being monitored so that optimal closed-loop operation can be achieved for reliable catalyst evaluation.

Thus, this invention provides a method to detect the degradation in the conversion efficiency of a catalyst under normal engine operating conditions. The degradation is detected by examining the amplitude of the air fuel fluctuations which result when a post-catalyst HEGO sensor is used in a low gain air fuel feedback loop. This can be characterized by plots of HEGO sensor voltage output for feedback from a HEGO sensor located after the catalyst for various catalyst conversion efficiencies.

BRIEF DESCRIPTION OF DRAWING

FIG. 5 is a logic flow diagram in accordance with an embodiment of this invention wherein feedback gain is increased until limit-cycle operation begins and then the gain is held constant, the frequency of limit-cycle operation indicating catalyst failure if it is greater than a predetermined stored frequency of limit-cycle operation.

DETAIL OF THE DESCRIPTION OF THE INVENTION

Figures 1A, 1B:
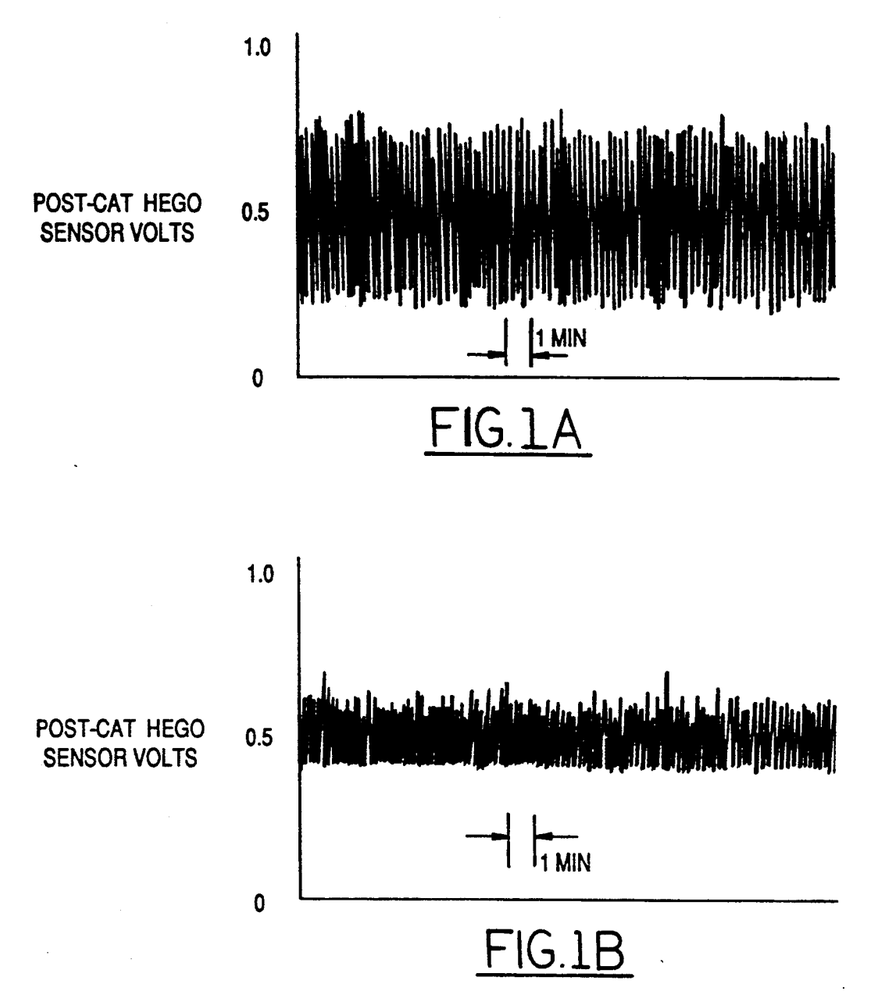
FIG. 1a is a graphical representation of post-catalyst HEGO sensor voltage versus time for a low feedback gain and a high conversion efficiency catalyst.
FIG. 1b is a post-catalyst HEGO sensor voltage output versus time for a low feedback gain and a medium conversion efficiency catalyst.
Figure 1C:
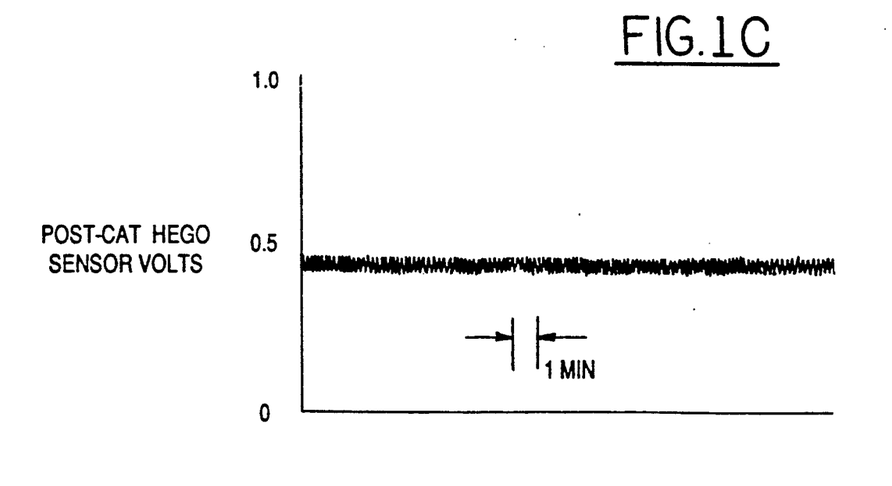
FIG. 1c is a post-catalyst HEGO sensor voltage output versus time for a low feedback gain and a zero conversion efficiency catalyst.

As noted previously, the amplitude of the fluctuations in the output signal of an HEGO sensor located downstream of a catalyst depends on 1) the conversion efficiency of the catalyst and 2) the gain of a closed-loop engine A/F feedback loop containing the catalyst and the downstream sensor. As an illustration of this, the output voltage of a HEGO sensor located downstream of a catalyst is shown as a function of time in FIGS. 1a, 1b, and 1c for a fixed low value of feedback gain (to be defined later) with, respectively, a high efficiency catalyst (HC conversion efficiency approximately 95%), a medium efficiency catalyst (HC conversion efficiency approximately 75%), and a dead catalyst (HC conversion efficiency less than 5%). In FIG. 1a, the HEGO sensor voltage has a fluctuation amplitude of approximately 0.2 volt RMS, while in FIG. 1b, the HEGO sensor voltage has a fluctuation amplitude of approximately 0.07 volt RMS. In FIG. 1c, the HEGO sensor voltage has a fluctuation amplitude of approximately 0.015 volt RMS. In FIGS. 1a, 1b, and 1c, the average value of the HEGO sensor voltage is approximately 0.5 volt, and the frequency of the amplitude fluctuations ranges from approximately 0.05 to 0.15 Hertz. The catalyst monitoring method of this invention uses the amplitude of the HEGO sensor fluctuations, not the average value, as an indication of catalyst efficiency. The average value of the HEGO sensor output, as explained in more detail later, is used by the A/F feedback controller to maintain the HEGO sensor at the midpoint (approximately 0.5 volt) of its output voltage range.

Figure 2:
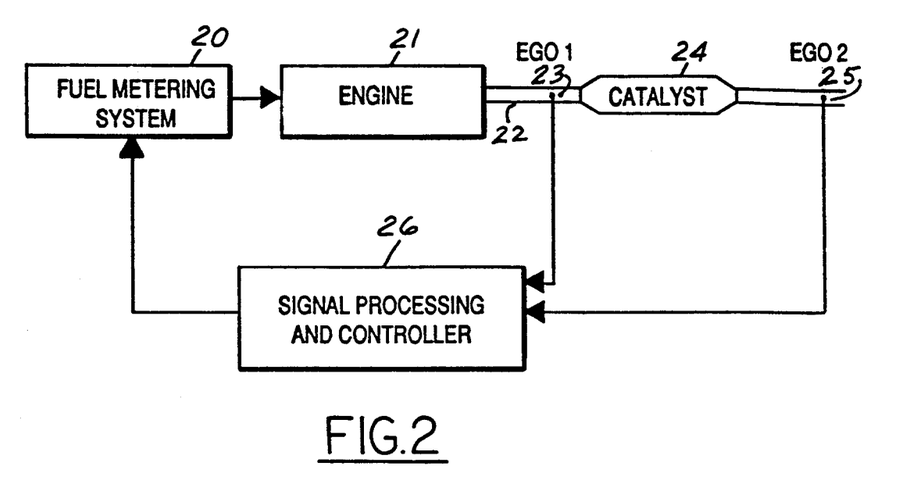
FIG. 2 is a typical block diagram of the connection of two HEGO sensors and their relationship to a catalyst.

The catalyst efficiency monitoring method of the invention is advantageously implemented in embodiments comprising a closed-loop fuel control system utilizing both an upstream and a downstream EGO sensor in the normal fuel control mode, and such a system is shown in FIG. 2. Referring to this Figure, a fuel metering system 20 produces a fuel control output to an engine 21 which then produces exhaust gas to an exhaust manifold 22. The exhaust gas flow first encounters an EGO sensor 23 which is located upstream of catalyst 24. Exhaust gas flow then goes through catalyst 24 to an EGO sensor 25 which is located downstream of the catalyst. Signals from EGO sensors 23 and 25 are applied to signal processing and controller unit 26. The output of signal processing and controller unit 26 is then fed back and applied to fuel metering system 20. The embodiments of this invention are applicable to using a heated exhaust gas oxygen (HEGO) sensor for each of EGO sensors 23 and 25. Alternatively, either or both of EGO sensors 23 and 25 can be a universal exhaust gas oxygen (UEGO) sensor which provides a linear output voltage versus A/F. For the purpose of describing a method to make and use this invention, HEGO sensors will be assumed for sensors 23 and 25. The characteristics and use of HEGO sensors are well known (see, for example, aforementioned U.S. Pat. No. 5,077,970 which is incorporated herein by reference).

Signal processing and controller unit 26 in FIG. 2 includes 1) the necessary signal conditioning steps to process the output of the post-catalyst HEGO sensor during the catalyst monitoring test and 2) the A/F feedback control elements required to operate the engine in a post-catalyst A/F feedback mode during the test. The A/F feedback controller used in the invention is a conventional integral controller which integrates the difference between the post-catalyst HEGO sensor output and a reference voltage (such as 0.5 volt), and then feeds back the result to maintain the engine A/F in the catalyst window. An example of a closed-loop feedback controller which can be used in controller unit 26 is discussed in detail within "A Closed-Loop A/F Control Model for Internal Combustion Engines," Douglas R. Hamburg and Michael A. Shulman, SAE Paper #800826, June, 1980, the disclosure of which is incorporated by reference herein. Applicant's invention adds to the feedback system of SAE Paper #880826 by 1) inserting a catalyst between the engine and the HEGO feedback sensor, and 2) using the characteristics of the HEGO sensor output signal as described in this invention to check the conversion efficiency of the catalyst.

The electronic integral control circuit shown and described in SAE paper #800826 is an example of a structure by which the A/F feedback used in this invention can be realized. In particular, as discussed in SAE paper #800826, the output of the feedback HEGO sensor is compared to a reference voltage equal to 0.5 volt. When the HEGO sensor output is greater than 0.5 volt (indicating a rich A/F condition), the integrator will produce an output A/F command which will linearly increase as function of time. Similarly, when the output of the HEGO sensor is less than 0.5 volt (indicating a lean A/F condition), the integrator will produce an output A/F command which will linearly decrease as a function of time. In this manner, the integral A/F feedback controller will regulate the engine A/F so that the average value of the post-catalyst HEGO sensor voltage is 0.5 volt (which is approximately the mid-range of the HEGO sensor output voltage range).

The rate at which the integrator output from controller unit 26 increases or decreases the engine A/F for a step change in the HEGO sensor output is defined as the gain of the post-catalyst A/F feedback system. This gain can be controlled by changing the time constant of the integrator circuit and/or by varying the output voltage level of the comparator connected between the HEGO sensor output and the integrator input. In general, for illustrative purposes relating to this invention, the integrator time constant will be set to give a post-catalyst A/F feedback system gain of approximately 0.01 A/F per second when the comparator output voltage is set at 10% of its maximum level. The comparator output voltage level will then be used to modify (i.e., change) the post-catalyst A/F feedback gain during the catalyst monitoring test as required by the various versions of the invention discussed later. The comparator output voltage level (for a given input to the comparator) will be controlled by the amplitude of an output voltage supplied from the vehicle's on-board computer. In this manner, the feedback gain can be varied in response to commands programmed into the computer.

Figure 3:
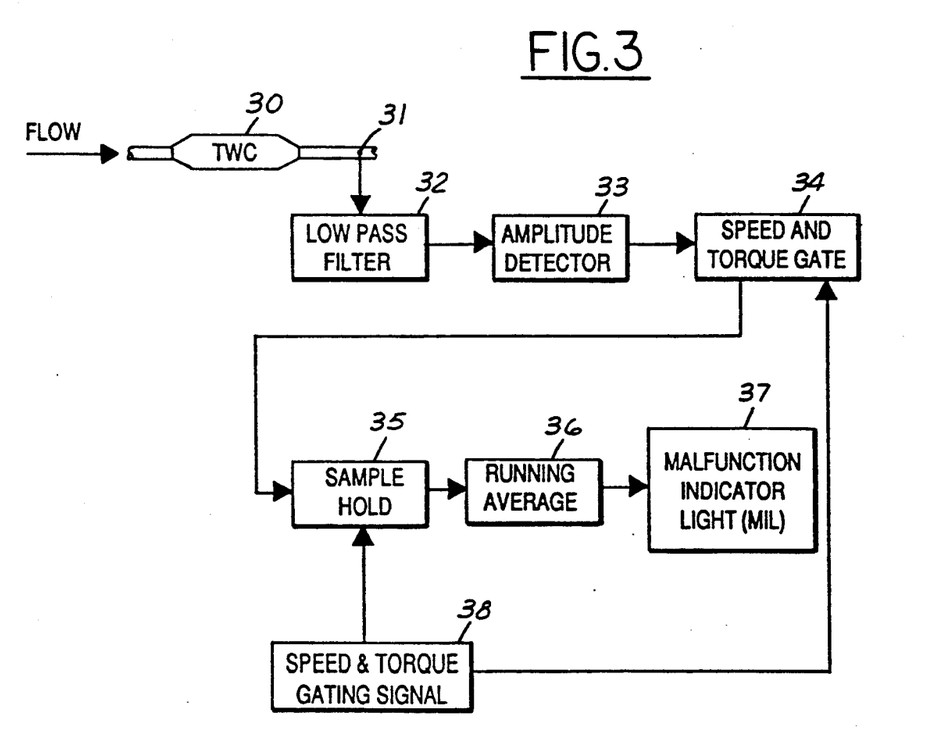
FIG. 3 is a block diagram of a signal processing arrangement from a downstream EGO sensor in accordance with a first embodiment of this invention.

The signal processing functions of signal processing and controller unit 26 will now be described with reference to FIG. 3. In FIG. 3, a three-way catalyst 30 has a downstream EGO sensor 31 which provides a signal output to low pass filter 32. Low pass filter 32 is desirable in that it eliminates any high frequency A/F noise (greater than approximately 1 Hz) produced by the engine. Signal flow from low pass filter 32 goes to an amplitude detector 33. Amplitude detector 33 calculates the RMS value of the amplitude fluctuations in the filtered HEGO sensor signal, and compares the result to a reference value which is chosen for the particular version of the catalyst monitoring method being used. (Details relating to the various versions of the catalyst monitoring method are described later.) Signal flow from amplitude detector 33 goes through the sequential blocks of a speed and torque gate 34, a sample and hold function 35, a running average function 36, and then a malfunction indicator light (MIL) 37. The speed and torque signals applied to both speed and torque gate 34 and sample and hold function 35 will be supplied from block 38 which contains information therein from engine sensors outputs with respect to engine operation. Block 38 is used to restrict operation over certain speed and load ranges to maintain accurate operation. Sample and hold function 35 is used in conjunction with running average function 36 to provide smoothing of the resulting signal fed to the malfunction indicator light (MIL) 37 to minimize false triggering of the MIL. The low pass filter 32, the amplitude detector 33, the speed and torque gate 34, the sample and hold function 35, and the running average function 36 can all be realized in the vehicle's on-board computer. Implementation of such functions in a computer is well known to those skilled in the art.

Figure 4:
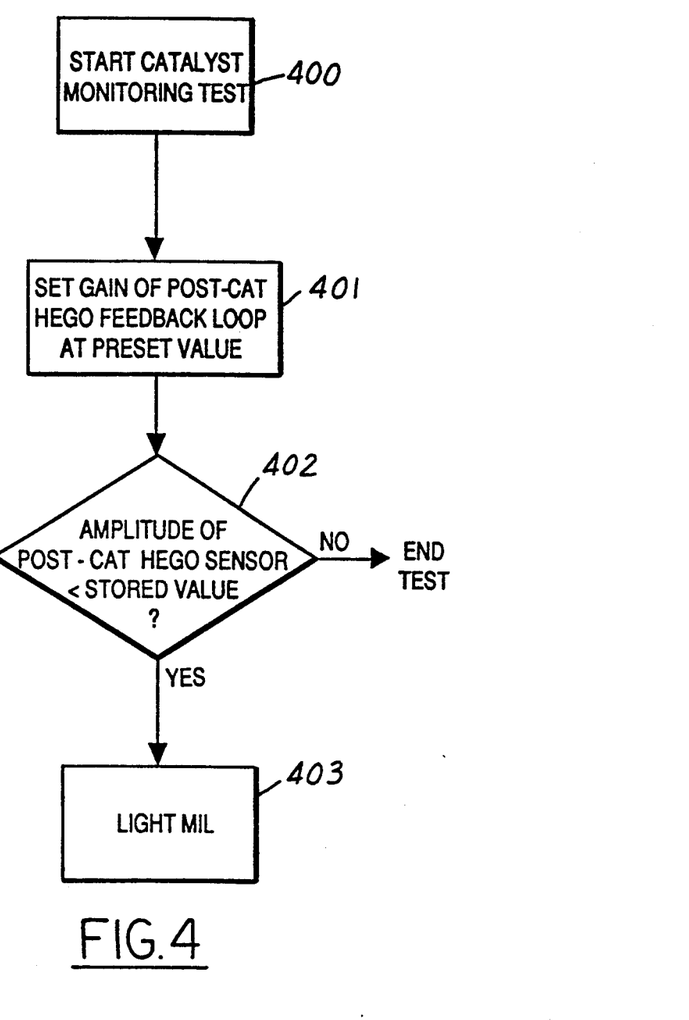
FIG. 4 is a logic flow diagram in accordance with an embodiment of this invention wherein low gain is used and EGO sensor signal amplitude is measured, high amplitude indicating high efficiency and low amplitude indicating low efficiency.

Various alternative techniques or versions of the invention are known and are described below starting with the first preferred version. In accordance with the first version, FIG. 4 shows the various steps in performing a catalyst monitoring test. In this version of the invention, any degradation in the catalyst conversion efficiency is indicated when a decrease in the amplitude fluctuations of the post-catalyst HEGO sensor output is detected compared to the value measured with a good catalyst. As noted earlier, the output amplitude fluctuations of a post-catalyst HEGO sensor will be large when the catalyst conversion efficiency is high. If the catalyst conversion efficiency should decrease and the feedback gain is not changed, the amplitude fluctuations of the post-catalyst HEGO sensor output would also decrease. When the amplitude fluctuations of the post-catalyst HEGO sensor output drop below a predetermined value (as measured by a conventional RMS amplitude detection circuit, for example), the catalyst would be judged as defective, and the malfunction indicator light will be energized, if desired. Specific details of the first version of the invention are discussed below with the aid of FIG. 4.

Referring to FIG. 4, the catalyst monitoring test for this first version of the invention begins at block 400 wherein the on-board computer determines that a catalyst efficiency test is required. Applicable regulations typically require that the test 1) be performed at the earliest opportunity after the beginning of closed-loop engine A/F operation for each driving cycle, 2) have a duration of no longer than 20 seconds, and 3) be performed at a reasonably steady vehicle speed between 20 mph and 50 mph, all accelerations and decelerations being less than 0.5 mph/second over any two second interval. If vehicle operation were to change during the catalyst monitoring test so that the conditions in 3) were no longer satisfied, the procedure would be aborted. The procedure would then be restarted as soon as the proper conditions were re-established.

Logic flow next goes to block 401 wherein the gain of the post-catalyst A/F feedback loop is set at a certain predetermined low value. The predetermined value for this step is extracted from the on-board computer memory where it had been previously stored along with all other engine and vehicle control parameters. The actual stored value of this feedback gain (which will depend on the particular vehicle, engine, and catalyst package to which the catalyst monitoring test is applied) will have been determined during a normal pre-production calibration procedure which is routinely performed by vehicle manufacturers on all their vehicle packages.

In general, the pre-production procedure for determining the post-catalyst A/F feedback gain for any particular vehicle package would involve 1) operating a representative test vehicle having a good catalyst (conversion efficiency approximately 95%) on a chassis dynamometer at a steady speed of approximately 30 mph, 2) observing the RMS value of the amplitude fluctuations in the post-catalyst HEGO sensor output (calculated in amplitude detector 33 in FIG. 3) by using the calibration console connected to the on-board computer, and 3) varying the feedback gain (using the calibration console connected to the on-board computer) until the RMS value of the amplitude fluctuations in the post-catalyst HEGO sensor output is approximately 0.2 volt. The value of the post-catalyst feedback gain thus determined would be placed in the on-board computer memory of all vehicles represented by the calibration procedure, and is the value used in block 401. Determination of this value is straightforward, and adds about 5 or 10 minutes to the normal one-time calibration procedure. A typical value for the predetermined feedback gain used in block 401 is in the range 0.005 to 0.015 A/F per second.

The actual gain-setting function of block 401 is carried out by the on-board computer by means of a programmed instruction which will be executed during the catalyst monitoring test. This instruction will cause the computer to output a voltage level (corresponding to the stored gain value) to the comparator in the signal processing and controller unit 26 of FIG. 2. The comparator output level will combine with the integrator time constant to change the overall post-catalyst A/F feedback gain as previously discussed.

After setting the gain of the post-catalyst A/F feedback loop at the predetermined low value, logic flow then goes to decision block 402 wherein the RMS value of the amplitude fluctuations in the HEGO sensor output is compared to a stored value. The actual comparison would be performed by the previously described amplitude detector 33 in FIG. 3. The particular stored comparison value will depend on the specific vehicle, engine, and catalyst package to which the catalyst monitoring test is being applied. This value will have been previously determined as part of the normal pre-production calibration process which vehicle manufacturers routinely perform on all their vehicle packages. In general, the pre-production calibration procedure for determining the stored comparison value for any particular vehicle package would simply involve 1) operating a representative test vehicle on a chassis dynamometer at a steady speed of approximately 30 mph with a catalyst having the lowest acceptable conversion efficiency (which present regulations specify as 80%), and 2) observing the RMS value of the amplitude fluctuations in the post-catalyst HEGO sensor output (calculated in amplitude detector 33 in FIG. 3) by using the calibration console connected to the on-board computer as a readout. The observed RMS value of the amplitude fluctuations in the post-catalyst HEGO sensor output thus determined would be placed in the on-board computer memory of all vehicles represented by the calibration procedure, and is the comparison value used in block 402. A typical value for the HEGO sensor output amplitude fluctuations that would result for a catalyst having an 80% HC conversion efficiency can be approximately 0.11 volt RMS.

As indicated in FIG. 4, if the RMS value of the amplitude fluctuations in the post-catalyst HEGO sensor output is not less than the stored comparison value, the test ends. In this case, the catalyst has a conversion efficiency greater than the lowest acceptable efficiency, and as indicated earlier, the HEGO sensor output amplitude fluctuations would be large. If the RMS value of the amplitude fluctuations in the post-catalyst HEGO sensor output is less than the stored comparison value, logic flow goes to block 403 wherein a malfunction indicator light (MIL) is lit. Note that the steps outlined in blocks 402 and 403 can utilize all the signal processing elements in signal processing and controller unit 26 previously discussed in connection with FIG. 3.

Operation of the first version of the catalyst monitoring method is presently understood to rely on the fact that when the catalyst is fresh, it has a very high degree of chemical activity. As such, it effectively "amplifies" the chemical noise which exists in the engine exhaust (and which produces the amplitude fluctuations in a post-catalyst HEGO sensor). As the catalyst deteriorates, its chemical activity decreases, and the amplitude of the chemical noise (and consequently the amplitude fluctuations of the post-catalyst HEGO sensor) decrease accordingly. The predetermined post-catalyst A/F feedback gain (typically 0.01 A/F per second as previously noted) is chosen to be sufficiently low to provide just the right amount of overall "amplification" so the HEGO sensor output doesn't saturate when a high efficiency (e.g. 95%) catalyst is used.

In summary, in a first version of the catalyst efficiency monitoring method, a low gain is applied to the post-catalyst A/F feedback loop and an examination of the post-catalyst HEGO sensor output is performed. The criteria used for monitoring is that a high conversion efficiency results in high amplitude fluctuations in the HEGO sensor output and a low conversion efficiency results in low amplitude fluctuations. As previously described, typical HEGO sensor outputs for this version of the invention are shown in FIGS. 1*a*, 1*b*, and 1*c*.

In accordance with a second version of the invention, operation of the catalyst efficiency monitoring method as described above would be modified by using the on-board computer to adjust the gain of the post-catalyst A/F feedback loop to maintain the RMS value of the amplitude fluctuations in the post-catalyst HEGO sensor output at some particular value, irrespective of the catalyst efficiency. In this manner, as the catalyst conversion efficiency decreases, the post-catalyst A/F feedback gain would be automatically increased by the on-board computer. This version of the invention would thus function by detecting when the post-catalyst A/F feedback gain exceeds some preset level, and would then use this determination as the criterion for indicating a catalyst failure. When the feedback gain exceeds the preset level, the malfunction indicator light can be energized, if desired. Details of the second version of the invention are discussed below with the aid of FIG. 5.

Figure 5:
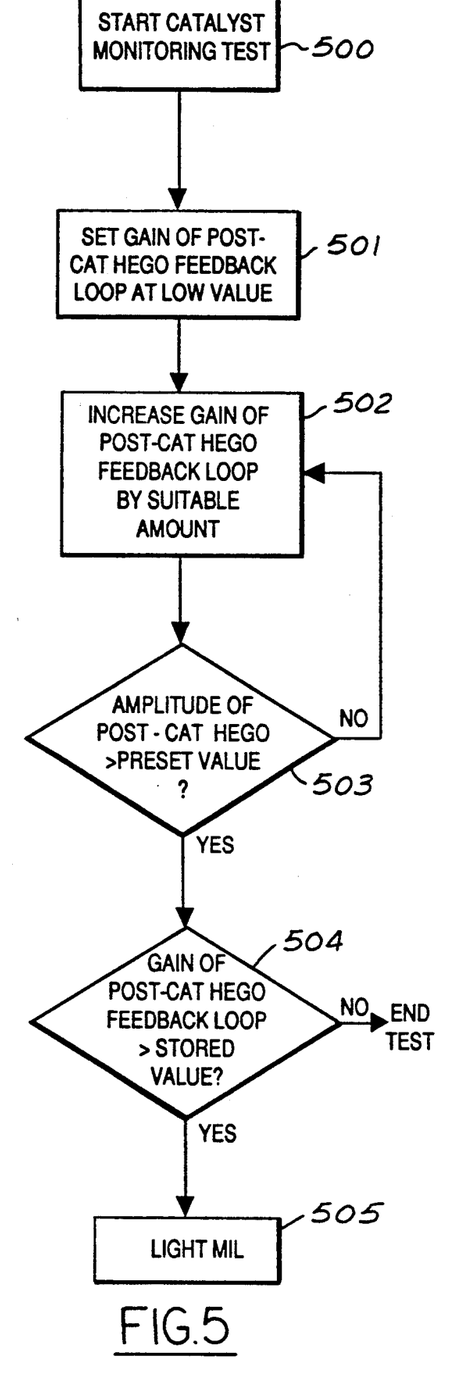
FIG. 5 is a logic flow diagram in accordance with an embodiment of this invention wherein feedback gain is increased until EGO sensor signal amplitude reaches a predetermined value and the feedback gain is then compared to a predetermined feedback gain value, with higher gain indicating lower conversion efficiency.

Referring to FIG. 5, the various logic flow steps for the second version of the catalyst monitoring method are presented. As this Figure indicates, the catalyst monitoring test begins at block 500 wherein the on-board computer determines that a catalyst efficiency monitoring test is required. The details of block 500 are identical to those previously discussed in connection with block 400 in the first version of the invention. Logic flow next goes to block 501 wherein the gain of the post-catalyst A/F feedback loop is set to a predetermined low value. The details of block 501, including the specific value for the predetermined gain, are identical to those previously discussed in connection with block 401 in the first version of the invention. After block 501, logic flow then proceeds to block 502 wherein the gain of the post-catalyst feedback loop is automatically increased by a certain increment. This step is carried out in the on-board computer by means of a programmed instruction which increases the feedback gain by a small amount (such as 10%). The computer would execute this gain change by appropriately increasing the supply voltage (by 10%) which it delivers to the comparator in the signal processing and controller unit 26 of FIG. 2 as previously discussed.

After completion of the gain increase, logic flow next goes to a decision block 503 wherein the RMS value of the amplitude fluctuations in the post-catalyst HEGO sensor output is compared to a pre-set value. This preset value is equal to the same RMS value of the post-catalyst HEGO sensor amplitude fluctuations originally used to calibrate the predetermined gain value used in step 501. As noted earlier, a reasonable choice for this preset value is 0.2 volt RMS. If the RMS value of the HEGO sensor output amplitude fluctuations is not greater than the preset value, the logic flow goes back to block 502 wherein the gain is again incrementally increased. If the RMS value of the HEGO sensor output amplitude fluctuations is greater than the preset value, the logic flow goes to decision block 504. At decision block 504, the gain of the post-catalyst exhaust gas oxygen sensor feedback loop is compared to a stored gain value. If the gain is not greater than the stored value, the catalyst is not considered defective, and the test ends. If the gain is greater than the stored value, logic flow goes to a block 505 wherein a malfunction indicator light (MIL) is lit.

The particular stored gain value used in decision block 504 will depend on the specific vehicle, engine, and catalyst package to which the catalyst monitoring test is being applied. This value will have been previously determined and stored in computer memory as part of the normal pre-production calibration procedure which automobile manufacturers routinely perform on all vehicle packages. In general, the pre-production calibration procedure for determining the stored gain value for any particular vehicle package would simply involve 1) operating a representative test vehicle on a chassis dynamometer at a steady speed of approximately 30 mph with a catalyst having the lowest acceptable conversion efficiency (which present regulations specify as 80%), and 2) increasing the feedback gain (by using the calibration console connected to the on-board computer) until the RMS value of the amplitude fluctuations in the post-catalyst HEGO sensor output (calculated in amplitude detector 33 in FIG. 3 and read out through the calibration console) was equal to 0.2 volt. The feedback gain value thus determined would be placed in the on-board computer memory of all vehicles represented by the calibration procedure, and is the value used in block 504. A typical value for the feedback gain which will produce a HEGO sensor output amplitude fluctuation of 0.2 volt RMS for a catalyst having an 80% HC conversion efficiency might typically be in the range 0.01 to 0.03 A/F per second.

As previously discussed in connection with the first version of the invention, operation of the invention is presently understood to rely on the fact that when the catalyst is fresh, it has a very high degree of chemical activity. As such, the catalyst effectively "amplifies" the chemical noise which exists in the engine exhaust (and which produces the amplitude fluctuations in a post-catalyst HEGO sensor). As the catalyst deteriorates, its chemical activity decreases, and the amplitude of the chemical noise (and consequently the amplitude fluctuations of the post-catalyst HEGO sensor) decrease accordingly. In the second version of the invention, this decrease in the amplitude fluctuations of the post-catalyst HEGO sensor is compensated for by an increase in the post-catalyst A/F feedback gain. In this manner, the amount that the feedback gain has to be increased to keep the same amplitude in the post-catalyst HEGO sensor output fluctuations is a measure of the decreased conversion efficiency. Although the relationship between the catalyst conversion efficiency and the feedback gain is non-linear and very complex, the feedback gain required to provide a certain fluctuation amplitude (such as 0.2 volt RMS) in the post-catalyst HEGO sensor output can be readily determined by the simple procedure previously outlined in connection with the discussion of block 504.

In summary for the second version, low gain is initially used in the post-catalyst A/F feedback loop. Then, during the catalyst testing interval, the feedback gain is increased until the amplitude fluctuations of the post-catalyst HEGO sensor reach some specified value. The monitoring criteria is based on the fact that high conversion efficiency requires a low feedback gain to produce a certain specified HEGO sensor output amplitude, and low conversion efficiency requires a high feedback gain to produce the same HEGO sensor output amplitude. Indication of catalyst failure occurs in this version of the invention case when the gain required to produce a specified output exceeds a certain threshold.

In a third version of the invention, the gain of the post-catalyst A/F feedback loop would initially be set at a low value at the beginning of the catalyst testing interval, just as in the other versions. As in the other versions, the low gain value is necessary in order to avoid an unacceptably high limit-cycle oscillation which would cause the HEGO sensor output voltage to saturate. Such saturation is undesirable because it prevents the sensor from detecting changes in the engine exhaust caused by moderate catalyst degradation. The catalyst monitoring test would begin by increasing the post-catalyst A/F feedback gain from its initial low value until a clearly defined limit-cycle oscillation (defined below) is detected by the output of the post-catalyst HEGO sensor. Once the limit-cycle oscillation is detected, the feedback gain will be held constant during the remainder of the testing interval, and the frequency of the limit-cycle oscillation will be determined. Catalyst failure will be considered as having occurred when the "measured" limit-cycle frequency is greater than a certain predetermined value. Such a determination can be accomplished in the on-board computer by checking the time interval between rich-to-lean and lean-to-rich voltage switches in the post-catalyst HEGO sensor output. In particular, when the switching interval is shorter than some predetermined value, catalyst failure would be indicated. Specific details of the third version of the invention are discussed below with the aid of FIG. 6.

Figure 6:
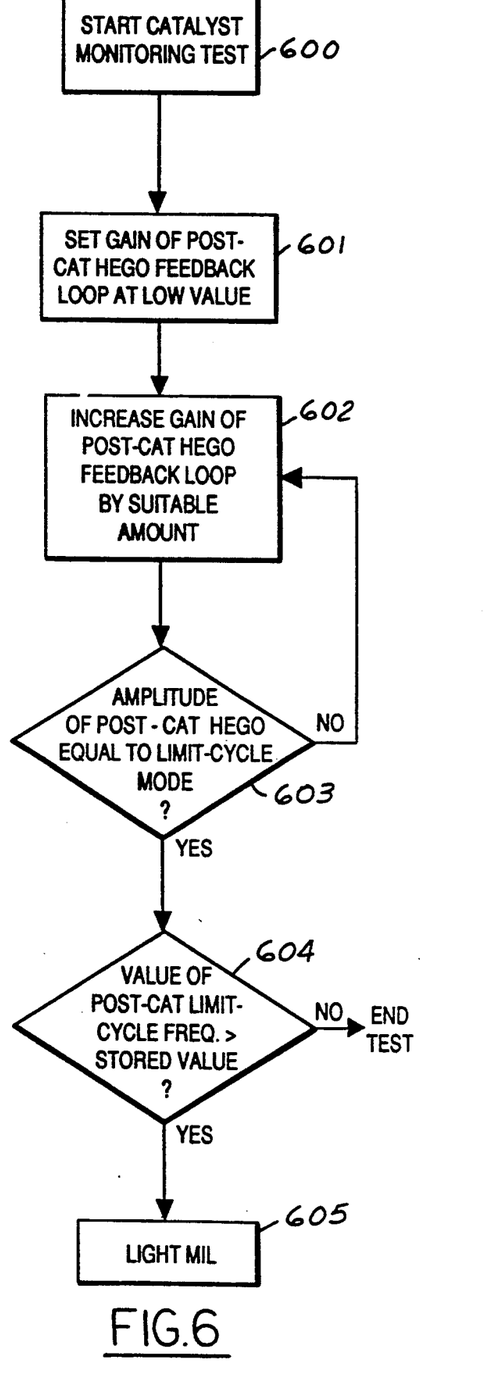

Referring to FIG. 6, the catalyst monitoring test for the third version of the invention begins at block 600 wherein the on-board computer determines that a catalyst efficiency monitoring test is required. The details of block 600 are identical to those previously discussed in connection with block 400 in the first version of the invention. Logic flow next goes to block 601 wherein the gain of the post-catalyst A/F feedback loop is set to a predetermined low value. The details of block 601, including the specific value for the predetermined gain, are identical to those previously discussed in connection with block 401 in the first version of the invention. After block 601, logic flow then proceeds to block 602 wherein the gain of the post-catalyst feedback loop is automatically increased by a certain increment. The details of block 602 are identical to those previously discussed in connection with block 502 in the second version of the invention. After completion of the gain increase, logic flow next goes to a decision block 603 wherein the amplitude of the post-catalyst HEGO sensor output voltage fluctuation is compared to a stored value corresponding to the amplitude which would exist when the post-catalyst A/F feedback loop is oscillating in a clearly defined limit-cycle mode.

As known in the art, when the post-catalyst A/F feedback loop is oscillating in a clearly defined limit-cycle mode, the HEGO sensor output voltage will switch back and forth between its "rich" and "lean" limits (i.e., between approximately 0.7 volt and 0.1 volt) at a fairly low frequency (approximately 0.1 Hertz for a good catalyst with a conversion efficiency of around 95%). When this occurs, the RMS value of the HEGO sensor output voltage fluctuation will typically be 0.3 volt. This value can thus be used as a simple indicator that a clearly defined limit-cycle oscillation is occurring, and is the value which will be stored in memory for use in decision block 603. If the amplitude of the post-catalyst HEGO sensor output voltage fluctuation is less than 0.3 volt RMS, the logic flow goes back to block 602 wherein the gain is again incrementally increased. If the amplitude of the post-catalyst HEGO sensor output voltage fluctuation is equal to (or greater than) 0.3 volt RMS, a clearly defined limit-cycle oscillation is indicated, and the logic flow goes to a decision block 604. At decision block 604, the value of the post-catalyst limit-cycle frequency is compared to a stored frequency value. If the value of the post-catalyst limit-cycle frequency is not greater than the stored frequency value, the catalyst is not considered defective, and the test ends. If the value of the post-catalyst limit-cycle frequency is greater than the stored frequency value, logic flow goes to a block 605 wherein a malfunction indicator light (MIL) is lit.

In order to measure the limit-cycle frequency as required in block 604, a simple subroutine would be programmed into the on-board computer. This subroutine will count the number of clock pulses which occur during the time interval that the post-catalyst HEGO sensor output remains "rich" following a lean-to-rich switch. As persons skilled in the art know, the HEGO sensor will indicate a "rich" condition whenever its output voltage is greater than approximately 0.65 volt. (Alternatively, the subroutine will count the number of clock pulses which occur during the time interval that the post-catalyst HEGO sensor output remains "lean" following a rich-to-lean switch. The HEGO sensor will indicate a "lean" condition whenever its output voltage is less than approximately 0.15 volt.) The number of clock pulses thus determined will be a measure of the half-period of the limit-cycle oscillation. The full period of the limit-cycle oscillation will therefore be equal to twice the number of clock pulses counted during the rich (or lean) interval divided by the clock pulse frequency. The limit-cycle frequency will then be equal to the reciprocal of the full period. As an example of this, suppose that the clock frequency was 100 pulses per second, and that 480 pulses were counted during a "rich" interval of the HEGO sensor output. The full period of the limit-cycle oscillation would thus be equal to $(2\times480)/100=9.6$ seconds, and the limit-cycle frequency would be equal to $1/9.6=0.104$ Hertz.

The particular stored frequency value used in decision block 604 will depend on the specific vehicle, engine, and catalyst package to which the catalyst monitoring test is being applied. This frequency value will have been previously determined and stored in computer memory as part of the normal pre-production calibration procedure which automobile manufacturers perform on all vehicle packages. In general, the pre-production calibration procedure for determining the stored frequency value for any particular vehicle package would simply involve 1) operating a representative test vehicle on a chassis dynamometer at a steady speed of approximately 30 mph with a catalyst having the lowest acceptable conversion efficiency (which present regulations specify as 80%), 2) increasing the post-catalyst A/F feedback gain (by using the calibration console connected to the on-board computer) until the RMS value of the amplitude fluctuation in the post-catalyst HEGO sensor output (calculated in amplitude detector 33 in FIG. 3 and read out through the calibration console) is equal to 0.3 volt, and 3) measuring the resulting limit-cycle frequency using the previously described computer subroutine. The frequency value thus determined would be placed in the on-board computer memory of all vehicles represented by the calibration procedure, and is the value used in block 604. A typical value for the limit-cycle frequency which will result for a catalyst having an 80% HC conversion efficiency might typically be in the range 0.4 to 0.7 Hertz.

Operation of the third version of the catalyst monitoring method is understood to rely on the fact that when the catalyst is fresh, it has a very high oxygen storage capacity. As a result, any changes in exhaust gas composition which appear at the inlet to a fresh catalyst are filtered and delayed by an appreciable amount before being detected by the post-catalyst HEGO sensor. As persons skilled in the art know, this delay will cause the post-catalyst A/F feedback loop to oscillate at a relatively low limit-cycle frequency (typically 0.1 Hertz for a catalyst with a 95% conversion efficiency). As the catalyst deteriorates, its oxygen storage capacity decreases. When this occurs, the catalyst will delay the changes in exhaust gas composition by a smaller amount before being detected by the post-catalyst HEGO sensor. Accordingly, the post-catalyst limit-cycle frequency will increase as the catalyst deteriorates, with typical values ranging from 0.4 to 0.7 Hertz for a catalyst having a conversion efficiency of 80%.

In summary for the third version of the invention, the post-catalyst A/F feedback gain is increased from an initial low value until it is high enough to produce a clearly defined limit-cycle oscillation. At that point, the gain is held constant and the limit-cycle frequency is measured. Indication of catalyst failure occurs when the measured limit-cycle frequency is greater than a certain predetermined value.

Closed-loop air-fuel control systems employing feedback from a post-catalyst HEGO sensor will likely employ feedback from a pre-catalyst HEGO sensor as well. In all versions of the invention discussed herein, the gain of such a feedback loop containing the pre-catalyst HEGO sensor must be set at a low value during the catalyst testing interval in order to avoid any discernible limit-cycle oscillation of that loop. If this were not done, the pre-catalyst limit-cycle oscillations could obscure the post-catalyst HEGO sensor amplitude/frequency measurements upon which the invention is based. Of course, if a UEGO sensor were used instead of a HEGO sensor for the pre-catalyst sensor, there would be no need to operate the pre-catalyst feedback loop in a limit-cycle mode, and the gain of that loop would not have to be set at a low value. It should also be noted that the post-catalyst HEGO sensor could similarly be replaced by a UEGO sensor. If this were done, the first two versions of the invention (i.e., the amplitude and gain measurement schemes) would still be applicable, but the limit-cycle frequency scheme generally would not.

Summarizing the explanations of operation of the invention, the desired characteristic for detecting catalyst malfunction can be a certain predetermined amplitude or a certain predetermined limit-cycle oscillation. The predetermined amplitude depends on the type of exhaust oxygen sensor used to examine the output of the catalyst. If a conventional HEGO sensor is used, the predetermined amplitude would be chosen to lie somewhere between the sensor output values shown in FIG. 1A and FIG. 1B. The predetermined feedback gain depends on the specific vehicle, engine, and catalyst package to which the invention is applied. The appropriate gain corresponding to a particular vehicle package will be determined during a pre-production calibration of the package. It will be chosen as the value which produces the predetermined amplitude (defined above) when a fresh catalyst is used. The feedback gain is increased until the predetermined amplitude of the exhaust gas oxygen sensor is obtained.

The gain is initially set to a sufficiently low value which will avoid a high amplitude limit cycle oscillation. The particular gain value which is used will depend on the specific vehicle, engine, and catalyst configuration involved. The appropriate value would be determined during the pre-production calibration of the specific vehicle package. To elaborate, the term "low gain" means that the gain is set just below the value which will produce a definite limit-cycle oscillation when the catalyst conversion efficiency is very high (i.e., when the catalyst is new). Stated in another way, "low gain" means that the gain is set as high as possible without causing the system to exhibit a definite limit-cycle oscillation.

High amplitude limit cycle refers to the situation where the amplitude of the limit cycle oscillation is so great that catalyst saturation will occur. As one skilled in the art knows, this means that the A/F fluctuations will "break through" the catalyst. The actual value which constitutes "high" is dependent on the specific vehicle, engine, and catalyst involved. A typical value might be $\pm 1$ A/F at 1 Hertz.

A clearly defined limit cycle oscillation is said to occur when the engine A/F cycles back and forth at a regular frequency with a relatively constant peak-to-peak amplitude. The clearly defined limit-cycle oscillation is an A/F oscillation in which the peak-to-peak amplitude is just high enough to be essentially constant (i.e., not vary randomly). A high amplitude limit-cycle oscillation is an A/F oscillation in which the amplitude is considerably high than that of the clearly defined limit-cycle oscillation. The amplitude of the high amplitude limit-cycle oscillation will produce catalyst breakthrough. The predetermined value of the limit cycle frequency is dependent on the specific vehicle, engine, and catalyst configuration used. It will be determined during a pre-production calibration of the vehicle package, and will be the value of the limit cycle frequency that occurs when using a catalyst which is marginally good (i.e., when using a catalyst with a HC conversion efficiency of approximately 70-80%).

In general, high amplitude fluctuations are shown in FIG. 1A and low amplitude fluctuations are shown in FIG. 1C. The precise value of the predetermined amplitude fluctuations depends on the specific vehicle, engine, and catalyst configuration used. In general, the typical predetermined amplitude fluctuations will lie between the oxygen sensor outputs shown in FIG. 1A and FIG. 1B. In general, high catalyst conversion efficiency refers to a HC conversion efficiency greater than approximately 80%. Low catalyst conversion refers to a HC conversion efficiency less than approximately 80%. In a vehicle implementation of the feedback system, the gain would be controlled using an on-board computer realization of the circuit given in SAE Paper #800826.

In accordance with an embodiment of this invention, the catalyst malfunction relates to the feedback gain. As the HC conversion efficiency of a catalyst deteriorates, the post-catalyst oxygen sensor output will decrease. This is shown in FIGS. 1A, 1B, and 1C. If the feedback gain were adjusted to always keep the oxygen sensor output at the same level, the gain would have to be increased as the HC conversion efficiency of the catalyst deteriorates. In this manner, the value of the feedback gain can be used as a detector for catalyst deterioration.

Various modifications and variations will no doubt occur to those skilled in the art to which this invention pertains. For example, the particular means of applying A/F feedback gain may be varied from that disclosed herein. These and other variations which basically rely on the teachings through which this disclosure has advanced the art are properly considered within the scope of this invention.

What is claimed is:

1. A method of detecting catalyst malfunction in a vehicle using an exhaust gas oxygen sensor downstream of the catalyst including the steps of:
   providing a feedback loop to control air-fuel ratio as a function of the signal from the exhaust gas oxygen sensor;
   increasing feedback loop gain by altering operating parameters of the feedback loop until a desired characteristic of an output of the exhaust gas oxygen sensor is achieved; and
   establishing catalyst malfunction as a function of the output of the exhaust gas oxygen sensor and the feedback gain.

2. A method as recited in claim 1, wherein the step of increasing the feedback gain is done until a predetermined fluctuation amplitude of an output of the exhaust gas oxygen sensor is reached and the step of establishing catalyst malfunction includes determining the feedback gain, comparing it to a predetermined feedback gain, and indicating malfunction when the feedback gain is greater than the predetermined feedback gain.

3. A method as recited in claim 2, wherein there is an automatic adjustment of the feedback gain of the feedback loop to maintain the exhaust gas oxygen sensor output fluctuations at the predetermined amplitude so that as the catalyst conversion efficiency decreases, the gain automatically increases.

4. A method as recited in claim 1, including the steps of:
   initially setting the gain of the post-catalyst feedback loop at a sufficiently low value at the beginning of the catalyst testing interval to avoid a high amplitude limit-cycle oscillation which would saturate the exhaust gas oxygen sensor downstream of the catalyst;
   increasing the gain until a clearly defined limit-cycle oscillation is developed as indicated by the output of the exhaust gas oxygen sensor downstream of the catalyst;
   holding the gain constant during the remainder of the testing interval;
   determining the frequency of the limit-cycle; and
   establishing catalyst failure when the limit-cycle frequency is greater than a certain predetermined value.

5. A method of detecting catalyst malfunction in a vehicle using an exhaust gas oxygen sensor downstream of the catalyst including the steps of:
   applying a low gain to a feedback loop from the exhaust gas oxygen sensor downstream of the catalyst;
   examining the amplitude fluctuations of the exhaust gas oxygen sensor output;
   determining there is a high catalyst conversion efficiency if there are high amplitude fluctuations;
   determining there is a low catalyst conversion efficiency if there are low amplitude fluctuations; and
   establishing a catalyst failure when the amplitude fluctuations are below a predetermined amount.

6. A method of detecting catalyst malfunction in a vehicle using an exhaust gas oxygen sensor downstream of the catalyst including the steps of:
   applying a low gain to a post-catalyst feedback loop;
   increasing the gain in the feedback loop until the amplitude fluctuations of the post-catalyst EGO sensor output reach a predetermined value;
   determining there is high conversion efficiency if a low gain is required to produce the predetermined value;
   determining there is a low conversion efficiency if a high gain is required to produce the predetermined value;
   determining the amount of gain required to produce the predetermined value; and
   establishing a catalyst failure when the gain is greater than a predetermined amount.

7. A method of detecting catalyst malfunction in a vehicle using exhaust gas oxygen sensor downstream of a catalyst including the steps of:
   applying a low gain to a post-catalyst feedback loop for controlling air-fuel ratio;
   increasing the gain in the feedback loop until the amplitude fluctuations of the post-catalyst EGO sensor output reach an air-fuel ratio limit-cycle operation;
   holding the gain constant at this level;
   measuring the limit-cycle frequency while the gain is held constant; and
   establishing a catalyst failure when the limit-cycle frequency is greater than a predetermined frequency.

8. An apparatus for detecting catalyst malfunction in a vehicle using an exhaust gas oxygen sensor downstream of the catalyst including:

a feedback loop to control air-fuel ratio as a function of the signal from the exhaust gas oxygen sensor;

means for increasing the feedback gain until a desired fluctuation amplitude of the exhaust gas oxygen sensor is achieved;

means for initially setting the gain of the post-catalyst feedback loop at a low value at the beginning of the catalyst testing interval to avoid a high amplitude limit-cycle oscillation which would saturate the exhaust gas oxygen sensor downstream of the catalyst, means for increasing the gain until a clearly defined limit-cycle oscillation is developed as indicated by the output of the exhaust gas oxygen sensor downstream of the catalyst;

means for holding the gain constant during the remainder of the testing interval;

means for determining the frequency of the limit-cycle; and means for establishing catalyst failure when the limit-cycle frequency is greater than a certain predetermined value.

9. An apparatus for detecting catalyst malfunction in a vehicle using an exhaust gas oxygen sensor downstream of the catalyst including:

means for applying a low gain to a feedback loop from the exhaust gas oxygen sensor downstream of the catalyst;

means for examining the amplitude fluctuations of the exhaust gas oxygen sensor output;

means for determining there is a high catalyst conversion efficiency if there are high amplitude fluctuations;

means for determining there is a low catalyst conversion efficiency if there are low amplitude fluctuations; and means for establishing a catalyst failure when the amplitude fluctuations are below a predetermined amount.

10. An apparatus for detecting catalyst malfunction in a vehicle using an exhaust gas oxygen sensor downstream of the catalyst including:

means for applying a low gain to a post-catalyst feedback loop;

means for increasing the gain in the feedback loop until the amplitude fluctuations of the post-catalyst EGO sensor output reach a predetermined value;

means for determining there is high conversion efficiency if a low gain is required to produce the predetermined value;

means for determining there is a low conversion efficiency if a high gain is required to produce the predetermined value;

means for determining the amount of gain required to produce the predetermined value; and means for establishing a catalyst failure when the gain is greater than a predetermined amount.

11. An apparatus for detecting catalyst malfunction in a vehicle using exhaust gas oxygen sensor downstream of the catalyst including:

means for applying a low gain to a post-catalyst feedback loop;

means for increasing the gain in the feedback loop until the amplitude fluctuations of the post-catalyst EGO sensor output reach an air-fuel ratio limit-cycle operation;

means for holding the gain constant at this level;

means for measuring the limit-cycle frequency while the gain is held constant; and means for establishing a catalyst failure when the limit-cycle frequency is greater than a predetermined frequency.

* * * * *